United States Patent
Xue et al.

(10) Patent No.: US 11,411,810 B2
(45) Date of Patent: Aug. 9, 2022

(54) FAULT LOCATING METHOD AND NETWORK DEVICE

(71) Applicant: HUAWEI TECHNOLOGIES CO., LTD., Guangdong (CN)

(72) Inventors: Li Xue, Nanjing (CN); Yuming Xie, Nanjing (CN); Liang Zhang, Nanjing (CN); Jun Wu, Nanjing (CN); Lv Ding, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 155 days.

(21) Appl. No.: 16/437,442

(22) Filed: Jun. 11, 2019

(65) Prior Publication Data

US 2019/0296968 A1 Sep. 26, 2019

Related U.S. Application Data

(63) Continuation of application No. PCT/CN2017/105881, filed on Oct. 12, 2017.

(30) Foreign Application Priority Data

Dec. 12, 2016 (CN) .......................... 201611138835.9

(51) Int. Cl.
*H04L 41/0677* (2022.01)
*G06F 17/18* (2006.01)
(Continued)

(52) U.S. Cl.
CPC .......... *H04L 41/0677* (2013.01); *G06F 17/18* (2013.01); *H04L 41/0631* (2013.01);
(Continued)

(58) Field of Classification Search
CPC ............... H04L 41/0677; H04L 41/142; H04L 41/5009; H04L 41/0631; H04L 43/0811; G06F 17/18
See application file for complete search history.

(56) References Cited

U.S. PATENT DOCUMENTS 7,254,114 B1 * 8/2007 Turner .................. H04L 41/142
370/244
9,660,860 B1 * 5/2017 Rekhter .............. H04L 41/0631
(Continued)

FOREIGN PATENT DOCUMENTS

CN      101431448 A     5/2009
CN      101877659 A    11/2010
(Continued)

OTHER PUBLICATIONS

Haddadi H et al:"Network topologies: inference,modeling,and generation",IEEE Communications Surveys and Tutorials,Institute of Electrical and Electronics Engineers,US,vol. 10,No. 2, Apr. 1, 2008, XP011230663, 22 pages.
(Continued)

*Primary Examiner* — Gregory B Sefcheck
*Assistant Examiner* — Joshua Smith
(74) *Attorney, Agent, or Firm* — Womble Bond Dickinson (US) LLP

(57) ABSTRACT

A fault locating method includes: receiving, by a first network device, a fault information packet flooded by another network device in a network, where each fault information packet includes statistical information about an interior gateway protocol packet of the network device sending the fault information packet, and the statistical information of each network device includes a statistical result on one or more key performance indicators KPIs of the network device; and determining, based on statistical information of the first network device and the statistical
(Continued)

information of the another network device, a network device on which a fault occurs in the network. According to the method, the fault information packet flooded by the network device is received, so that information required for fault locating, that is, the KPI of the network device, can be quickly collected. This facilitates a fault locating process and reduces a fault locating time.

14 Claims, 4 Drawing Sheets

(51) Int. Cl.
*H04L 43/0811* (2022.01)
*H04L 41/0631* (2022.01)
*H04L 41/142* (2022.01)
*H04L 41/5009* (2022.01)

(52) U.S. Cl.
CPC ........ *H04L 41/142* (2013.01); *H04L 41/5009* (2013.01); *H04L 43/0811* (2013.01)

(56) References Cited

U.S. PATENT DOCUMENTS

| | | | | |
|---|---|---|---|---|
| 2004/0049563 | A1* | 3/2004 | Orcutt | H04L 41/142 709/223 |
| 2004/0141604 | A1 | 7/2004 | Shaffer et al. | |
| 2005/0122908 | A1* | 6/2005 | Soumiya | H04L 41/0677 370/241 |
| 2008/0005620 | A1* | 1/2008 | Walker | G06F 11/0781 714/43 |
| 2009/0109862 | A1* | 4/2009 | Capello | H04L 49/555 370/242 |
| 2009/0252046 | A1 | 10/2009 | Canright et al. | |
| 2011/0096780 | A1* | 4/2011 | Darwish | H04L 45/507 370/392 |
| 2013/0290230 | A1 | 10/2013 | Bodog et al. | |
| 2013/0315103 | A1* | 11/2013 | Riedl | H04L 12/462 370/254 |
| 2015/0271763 | A1* | 9/2015 | Balachandran | H04L 7/0054 370/338 |
| 2018/0092003 | A1* | 3/2018 | Lindheimer | H04L 47/74 |

FOREIGN PATENT DOCUMENTS

| | | |
|---|---|---|
| CN | 103051956 A | 4/2013 |
| CN | 103945442 A | 7/2014 |
| CN | 103973496 A | 8/2014 |
| CN | 105071968 A | 11/2015 |
| WO | 2012/042440 A2 | 4/2012 |
| WO | 2016/178134 A1 | 11/2016 |

OTHER PUBLICATIONS

Rong Feng, Reliability and Risk Assessment of Machining Centers Based on Failure Rate. Jilin University, 2015, 62 pages.

D. Katz et al, Traffic Engineering (TE) Extensions to OSPF Version 2. RFC3630, Sep. 2003, 14 pages.

R. Coltun, The OSPF Opaque LSA Option. RFC2370, Jul. 1998, 15 pages.

* cited by examiner

FAULT LOCATING METHOD AND NETWORK DEVICE

CROSS-REFERENCE TO RELATED APPLICATIONS

This application is a continuation of International Application No. PCT/CN2017/105881, filed on Oct. 12, 2017, which claims priority to Chinese Patent Application No. 201611138835.9, filed on Dec. 12, 2016. The disclosures of the aforementioned applications are hereby incorporated by reference in their entireties.

TECHNICAL FIELD

Embodiments of the present invention relate to the communications field, and more specifically, to a fault locating method and a network device.

BACKGROUND

Faults often occur in a network. If a network device or a link on which a fault occurs is not located and processed in time, the fault may spread to the entire network, that is, network flapping occurs. The network flapping leads to breakdown and service interruption of the entire network. For example, it is assumed that a clock failure occurs in a routing device and causes a system time of the routing device to be earlier than a system time of another routing device in the network by hundreds of times. Consequently, the another routing device in the entire network repeatedly deletes and generates entries corresponding to the routing device that has the clock failure, consuming many resources of the another routing device. When the resources of the another routing device are used up, breakdown and service interruption of the entire network occurs.

When a fault occurs in a network, how to locate a network device on which the fault occurs is a difficult problem. Using a flapping-type fault as an example, locating of the flapping-type fault has the following two problems:

1. When a flapping-type fault occurs, it is difficult to collect fault information about network devices in an entire network, significantly affecting a fault analysis process. Among network devices in the entire network, some do not support network management and maintenance, and some do not fall within a deployment range of network management. Therefore, when the flapping-type fault occurs, Telnet is usually required to log in to different network devices and collect fault information about the network devices that are logged in to. For example, to collect status information of central processing units (CPU) of all routers in the entire network, each router in the entire network needs to be logged in to, to collect status information of a CPU of each router. In addition, according to the Telnet protocol, different network devices are grouped and then logged in to one by one to collect information. Therefore, a plurality of network devices are required to remotely access the network, and the fault information collection and fault locating efficiency are low.

2. When the flapping-type fault is analyzed, manual troubleshooting needs to be performed on massive information about many network devices. Such a manner requires operation and maintenance personnel to have rich device operation and maintenance experience, and the analysis efficiency is low, leading to long duration of a fault and a significant impact on services.

SUMMARY

Embodiments of the present invention provide a fault locating method and a network device, to quickly and accurately locate a network device on which a fault occurs in a network.

According to a first aspect, a fault locating method is provided. A first network device receives a fault information packet flooded by another network device, where each fault information packet includes statistical information about an interior gateway protocol packet of the network device sending the fault information packet, and the statistical information of each network device includes a statistical result on one or more key performance indicators KPIs of the network device; and the first network device determines, based on statistical information of the first network device and the statistical information of the another network device, a network device on which a fault occurs in a network.

The fault information packet sent by the network device in the flooding manner is received, so that information required for fault locating, that is, the KPI of the network device, can be quickly collected. This facilitates a fault locating process and reduces a fault locating time.

In one embodiment, the first network device obtains the statistical information of the first network device, where the statistical information includes a statistical result on one or more KPIs of the first network device; and the first network device floods a fault information packet of the first network device to the another network device, where the fault information packet of the first network device includes the statistical information of the first network device.

In one embodiment, the flooding, by the first network device, a fault information packet of the first network device to the another network device includes: flooding, by the first network device, the fault information packet of the first network device to the another network device based on a first preset period; or flooding, by the first network device when a statistical result on a first KPI of the first network device satisfies a preset condition, the fault information packet of the first network device to the another network device.

In one embodiment, the preset condition is satisfied includes that the statistical result on the first KPI of the first network device is greater than or equal to a KPI threshold set by the first network device for the first KPI.

The fault information packet of the first network device is flooded to the another network device when the KPI of the first network device satisfies the preset condition, so that network bandwidth resources occupied by the fault information packet are reduced.

In one embodiment, by the first network device based on statistical information of the first network device and the statistical information of the another network device, a network device on which a fault occurs in the network includes: determining, by the first network device, a target KPI; calculating, by the first network device based on the statistical information of the first network device and the statistical information of the another network device, a KPI change rate of the target KPI on each network device in the network; and selecting, by the first network device based on the KPI change rate of the target KPI on each network device in the network, the network device on which a fault occurs from the first network device and the another network device, where the KPI change rate of the target KPI on the network device on which a fault occurs is greater than or equal to a preset KPI change rate threshold.

By analyzing the KPI change rates of the network devices, the network device on which a fault occurs can be quickly located.

In one embodiment, the determining, by the first network device based on statistical information of the first network device and the statistical information of the another network device, a network device on which a fault occurs in the network includes: determining, by the first network device, a target KPI; obtaining, by the first network device based on the statistical information of the first network device and the statistical information of the another network device, a statistical result that corresponds to the target KPI and that is on an interior gateway protocol packet transmitted between any two network devices in the network; generating an adjacency matrix based on the statistical result that corresponds to the target KPI and that is on an interior gateway protocol packet transmitted between any two network devices; determining a centrality of each network device in the network based on the adjacency matrix; and determining the network device on which a fault occurs in the network based on the centrality of each network device.

The adjacency matrix is generated based on the statistical result that corresponds to the target KPI and that is on an interior gateway protocol packet transmitted between any two network devices, and the centrality of the generated adjacency matrix is calculated. In this way, the network device on which a fault occurs can be accurately located.

In one embodiment, the fault information packet is a packet dedicated for carrying a KPI of a network device.

In one embodiment, the fault information packet is a packet based on an interior gateway protocol IGP.

In one embodiment, the another network device includes a second network device, a fault information packet sent by the second network device carries a statistical result on one or more KPIs of a third network device neighboring to the second network device, and the third network device is a network device that does not support transmission of the fault information packet.

According to a second aspect, a network device is provided, including one or more modules configured to perform the method according to the first aspect.

According to a third aspect, a network device is provided, including a memory and a processor. The memory is configured to store program code. The processor is configured to invoke the program code to implement the method according to the first aspect and the implementations of the first aspect.

According to a fourth aspect, a computer-readable medium is provided. The computer-readable medium is configured to store program code that can be executed by the network device. The program code includes an instruction used to perform the method according to the first aspect and the implementations of the first aspect.

DESCRIPTION OF EMBODIMENTS

The following clearly describes the technical solutions in the embodiments of the present invention with reference to the accompanying drawings in the embodiments of the present invention.

Figure 1:
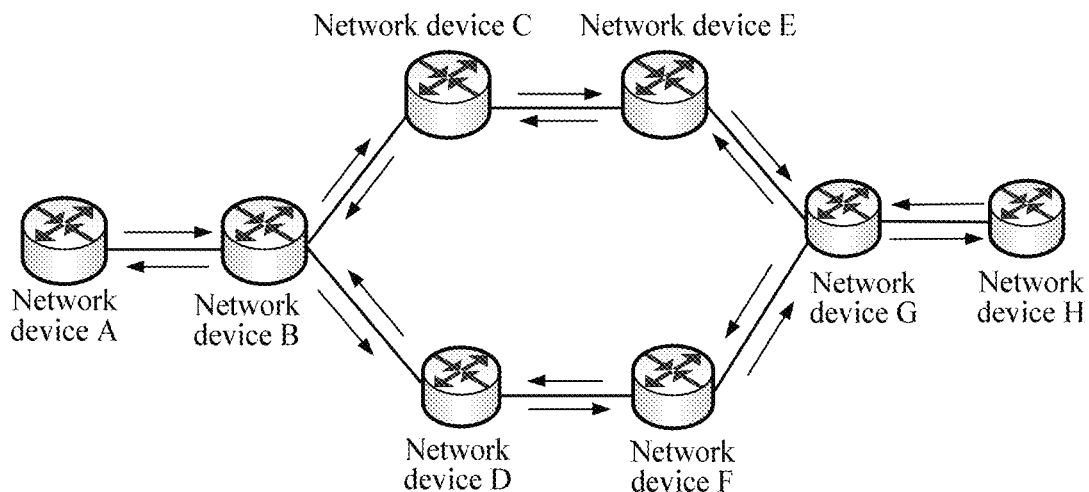
FIG. 1 is a schematic architectural diagram of an application scenario according to an embodiment of the present invention.

FIG. 1 is a schematic architectural diagram of an application scenario according to an embodiment of the present invention. As shown in FIG. 1, a network 100 includes network devices A, B, C, D, E, F, G, and H, and the plurality of network devices are connected. The network devices in the network 100 may be routers, switches, hubs, bridges, gateways, or other types of network devices. The types of the network devices may be the same or different.

When a fault occurs on a network device in the network 100, a network device in the network 100 may receive a fault information packet flooded by another network device in the network. Each fault information packet includes a key performance indicator (KPI) of the network device sending the fault information packet. Any network device in the network may quickly and accurately locate the network device on which a fault occurs in the network based on the KPIs of all the network devices in the network.

Based on the application scenario shown in FIG. 1, an embodiment of the present invention provides a fault locating method, to quickly collect information for fault locating, thereby improving the fault locating efficiency. The following describes the method in detail with reference to FIG. 2.

Figure 2:
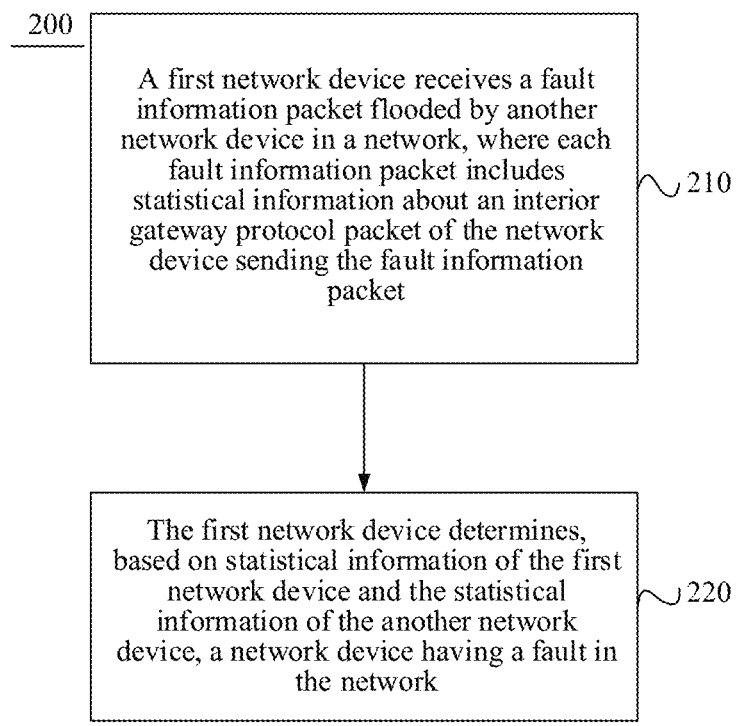
FIG. 2 is a schematic flowchart of a fault locating method according to an embodiment of the present invention.

FIG. 2 is a schematic flowchart of a fault locating method 200 according to an embodiment of the present invention. The method 200 may be performed by a first network device. The first network device may be any network device in a network. For example, the first network device may be a network device A in a network 100 or another network device in the network 100. The method 200 shown in FIG. 2 includes:

Operation 210: The first network device receives a fault information packet flooded by another network device in a network, where each fault information packet includes statistical information about an interior gateway protocol packet of the network device sending the fault information packet, and the statistical information of each network device includes a statistical result on one or more key performance indicators KPIs of the network device.

Operation 220: The first network device determines, based on statistical information of the first network device and the statistical information of the another network device, a network device on which a fault occurs in the network.

In one embodiment, any network device in the network receives a fault information packet flooded by another network device in the network. Each fault information packet includes statistical information about an interior gateway protocol packet of the network device sending the fault information packet. The any network device determines, based on statistical information of the any network device and the statistical information of the another network device in the network, a network device on which a fault occurs in the network. In this way, difficulty in collecting fault information when a network device has a fault in the network is resolved, and a network fault can be quickly and accurately located.

It should be understood that, flooding is a packet delivery technology. That a network device floods fault information packet means that the network device sends the fault information packet through all interfaces of the network device.

After network devices flood fault information packets to each other, each network device receives the fault information packet from another network device, thereby collecting a KPI of the another network device. When a network device has a fault, operation and maintenance personnel may log in to any network device and locate a fault based on a KPI of the network device and a KPI of another network device that is collected by the network device.

In operation 220, when the first network device determines, based on statistical information of the first network device and the statistical information of the another network device, a network device on which a fault occurs in the network, the first network device may determine the network device on which a fault occurs in the network based on a KPI change rate of a network device.

It should be understood that, a KPI change rate of a KPI is a change rate of a statistical result on the KPI in a first time period relative to a statistical result on the KPI in a second time period. Assuming that the KPI indicator is a quantity of received IS-IS hello packets, the statistical result in the first time period T0 is 100, and the statistical result in the second time period T1 is 150, the KPI change rate is (150−100)/100=50%.

In one embodiment, the first network device determines a target KPI. The target KPI is a KPI to be analyzed at a current moment. After the target KPI is determined, the first network device calculates, based on the statistical information of the first network device and the statistical information of the another network device in the network, a KPI change rate of the target KPI on each network device in the network, and determines, when the KPI change rate of the target KPI on a network device in the network is greater than or equal to a preset KPI change rate threshold, the network device as the network device on which a fault occurs. There may be one or more network devices on which a fault occurs.

There may be one or more target KPIs determined herein. There may also be one or more target KPIs whose KPI change rates are greater than or equal to the preset KPI change rate threshold.

For example, when determining that the target KPI is a quantity of received Intermediate System to Intermediate System (IS-IS) routing protocol packets, the first network device calculates a change rate of a quantity of received IS-IS routing protocol packets on each network device in the network, and determines, when the change rate of the quantity of received IS-IS routing protocol packets on one or more network devices is greater than or equal to a first preset threshold, the one or more network devices as network devices on which a fault occurs.

In one embodiment, different preset KPI change rate thresholds may be set for different target KPIs.

In some embodiments, when the first network device determines, based on statistical information of the first network device and the statistical information of the another network device, a network device on which a fault occurs in the network, the first network device may obtain a statistical result that corresponds to the target KPI and that is on an interior gateway protocol packet transmitted between any two network devices in the network, and generate an adjacency matrix based on the statistical result; determine a centrality of each network device based on the adjacency matrix; and determine the network device on which a fault occurs in the network based on the centrality of each network device.

The adjacency matrix is a matrix indicting a connection relationship between any two network devices in the network. For example, when a statistical result that corresponds to the target KPI and that is on an interior gateway protocol packet transmitted between a network device A and a network device B may be obtained, the network device A and the network device B may be considered as network devices in a connection relationship, and the statistical result on the target KPI of the network device A and the network device B is used as an element of the adjacency matrix.

A centrality of a network device is a degree of a core position of a network device in the network, and reflects the importance of the network device in the network. In the network, closer correlation and more frequent interaction between a network device and a surrounding network device indicate a higher core position and greater importance of the network device in the network, that is, a higher centrality of the network device. In this embodiment of the present invention, a centrality of a network device is used to determine the network device on which a fault occurs in the network.

In one embodiment, the first network device determines a target KPI. The target KPI is a KPI to be analyzed at a current moment. After determining the target KPI, the first network device obtains, based on the statistical information of the first network device and the statistical information of the another network device, a statistical result that corresponds to the target KPI and that is on an interior gateway protocol packet transmitted between any two network devices in the network, and generates an adjacency matrix based on the statistical result; determines a centrality of each network device based on the adjacency matrix; and determines the network device on which a fault occurs in the network based on a network device corresponding to the centrality of each network device.

For example, a network device corresponding to a highest centrality in centralities of all the network devices in the network is determined as the network device on which a fault occurs. For another example, a network device corresponding to a lowest centrality in centralities of all the network devices in the network may be alternatively determined as the network device on which a fault occurs.

It should be understood that, the target KPI determined herein is a determined target KPI at a current moment, that is, an adjacency matrix may be obtained by collecting statistics on the target KPI at the current moment.

Table 1 shows an adjacency matrix array$j_{ij}$ generated, when a target KPI of a network device is a quantity of received IS-IS routing protocol packets, based on a statistical result on a quantity of received IS-IS routing protocol packets transmitted between any two of network devices A, B, C, D, E, F, G, and H. In Table 1, Array$_{ij}$ represents a statistical result on the target KPI, transmitted between a network device i and a network device j, on the network device i. A statistical result on the target KPI transmitted between a network device and the network device itself is 0. For example, data in the third row and the second column in Table 1 represents a statistical result that is on a quantity of IS-IS routing protocol packets received by the network device B from the network device A and that is of the network device B.

As shown in Table 1, it can be learned that data in the fourth row and the third column Table 1 is apparently much larger compared with data in another row and another column. This indicates that the network device B corresponding to the fourth row and the third column is more closely correlated with another network device in the network. In other words, a fault may occur on the network device B corresponding to the fourth row and the third column. Then, a centrality of each network device in the adjacency matrix is calculated based on the adjacency matrix shown in Table 1, and it is determined through calculation that the centrality of the network device B is the largest. Therefore, it can be determined that the network device B is the network device on which a fault occurs.

For example, a centrality of the $i^{th}$ network device in the adjacency matrix may be calculated in the following manner. First, an eigenvector and an eigenvalue of the adjacency matrix are calculated, and the $i^{th}$ component of an eigenvector corresponding to a largest eigenvalue is obtained, so that the centrality of the $i^{th}$ network device in the network may be obtained.

TABLE 1

Adjacency matrix of network devices A, B, C, D, E, F, G, and H

| Array$_{ij}$ | A | B | C | D | E | F | G | H |
|---|---|---|---|---|---|---|---|---|
| A | 0 | 23305 | 5 | 5 | 5 | 5 | 4 | 5 |
| B | 29109 | 0 | 81120 | 82505 | 123443 | 81847 | 81236 | 82268 |
| C | 7 | 73020 | 0 | 92 | 141 | 76 | 215 | 68 |
| D | 7 | 74395 | 1 | 0 | 1 | 278 | 1 | 175 |
| E | 7 | 108445 | 163 | 74 | 0 | 64 | 150 | 68 |
| F | 7 | 73660 | 1 | 214 | 1 | 0 | 1 | 136 |
| G | 7 | 73116 | 216 | 91 | 170 | 74 | 0 | 63 |
| H | 7 | 74111 | 1 | 200 | 1 | 151 | 1 | 0 |

In this embodiment of the present invention, any network device in the network receives the fault information packet flooded by another network device in the network. Therefore, information required for fault locating, that is, a KPI of each network device in the network, may be obtained by logging in to any network device in the network. Then, the network device on which a fault occurs in the network may be determined based on the KPI of each network device in the network. In this way, difficulty in collecting fault information when the network has a fault is resolved, and a fault can be quickly and accurately located.

When network flapping is caused by a fault in a network, a protocol related to the flapping-type fault is usually an interior gateway protocol (IGP). Common IGP protocol types are: IS-IS routing protocol, an Open Shortest Path First (OSPF) protocol, Routing Information Protocol (RIP), and Enhanced Interior Gateway Routing Protocol (EIGRP). In this embodiment of the present invention, a KPI about an IS-IS routing protocol packet is used as an example to describe a KPI of each network device in this embodiment of the present invention. However, this embodiment of the present invention is not limited thereto.

Table 2 shows a KPI about an IS-IS routing protocol packet.

TABLE 2

KPI about an IS-IS routing protocol packet

| KPI about an IS-IS routing | A quantity of received IS-IS routing protocol packets<br>A quantity of sent IS-IS routing protocol packets |
|---|---|

TABLE 2-continued

KPI about an IS-IS routing protocol packet

| protocol packet | A quantity of received incorrect hello packets<br>A quantity of received incorrect link state packets (English: Link State Packets, "LSP" for short)<br>A quantity of times a neighbor is down<br>A quantity of new IS-IS neighbors<br>A quantity of received Purge Link State Protocol (Purge LSP) packets<br>A quantity of received complete sequence numbers protocol (CSNP) packets<br>A quantity of received partial sequence numbers protocol (PSNP) packets<br>A quantity of changes of local LSPs |
|---|---|

It should be understood that, this embodiment of the present invention is described by using only the example of the KPI about an IS-IS routing protocol packet. However, this embodiment of the present invention is not limited thereto. It should be further understood that, the KPI of the network device in this embodiment of the present invention is not limited to the KPI about the IS-IS protocol, but may be alternatively a KPI about a packet of another protocol of IGP protocols, for example, a KPI about an OSPF protocol packet, a KPI about a RIP protocol packet, or a KPI about an EIGRP protocol packet. This embodiment of the present invention is not limited thereto.

In some embodiments, a fault information packet carrying a KPI of a network device is defined. The fault information packet may be a packet dedicated for carrying a KPI of a network device, or a packet dedicated for carrying a KPI of a network device and extended based on an existing IGP protocol packet.

When the fault information packet is a packet dedicated for carrying a KPI of a network device, the packet is defined based on a type-length-value (TLV) field, and the packet dedicated for carrying a KPI of a network device carries a KPI identifier, a KPI value, a system identifier, a KPI source system identifier, and a KPI destination system identifier of the network device. For example, Table 3 shows the fault information packet dedicated for carrying a KPI of a network device. A type of the fault information packet is being used for carrying a KPI of a network device, a packet length is a length of packet content, the KPI identifier is used to indicate different KPIs of a same network device, the KPI value is magnitude of the KPI, the system identifier is used to indicate a network device sending the fault information packet, the KPI source system identifier is used to indicate a network device to which the KPI carried in the fault information packet belongs, and the KPI destination system identifier is used to indicate a network device receiving the KPI.

For example, when a network device A sends a plurality of fault information packets to a network device B, system identifiers of the plurality of fault information packets are the same and are all used to indicate that the plurality of fault information packets are sent by the network device A, a KPI source system identifier in a fault information packet carrying a KPI of the network device A is used to indicate that the fault information packet carries the KPI of the network device A, a KPI source system identifier in a fault information packet carrying a KPI of a network device C is used to indicate that the fault information packet carries the KPI of the network device C, and a KPI destination system identifier is used to indicate that a network device receiving a KPI is the network device B. In this way, the fault information packet carrying the KPI of the network device A may be easily distinguished from a plurality of fault information packets by using the KPI source system identifier when statistics on the KPI of the network device A is collected.

In Table 3, for example, the packet type is one byte, the packet length is one byte, the KPI identifier is one byte, the KPI value is 16 bytes, the system identifier is six bytes, the KPI source system identifier is six bytes, and the KPI destination system identifier is six bytes. However, byte lengths of the KPI identifier and the KPI value in this embodiment of the present invention may not be limited thereto. For example, the KPI identifier may be alternatively two bytes, and the KPI value may be alternatively 20 bytes.

TABLE 3

| Packet dedicated for carrying a KPI of a network device | | | |
|---|---|---|---|
| Packet type (one byte) | | | |
| Packet length (one byte) | | | |
| Whether to support protocol extension (one bit) | Reserved (seven bits) | | |
| System identifier (six bytes) | | | |
| KPI identifier (one byte) | KPI value (16 bytes) | KPI source system identifier (six bytes) | KPI destination system identifier (six bytes) |

When the fault information packet is a packet extended based on an existing IGP protocol packet, a TLV field of the IGP protocol packet may be extended. For example, a TLV field of an LSP packet of the IS-IS routing protocol is extended. The extended TLV field carries a KPI identifier, a KPI value, a system identifier, a KPI source system identifier, and a KPI destination system identifier of the network device.

In some embodiments, the first network device may further flood a fault information packet of the first network device to the another network device in the network. The fault information packet includes the statistical information of the first network device, and the statistical information of the first network device includes the statistical result on the one or more KPIs of the first network device.

In some embodiments, the first network device may flood the fault information packet of the first network device to the another network device in the network based on a first preset period. For example, when the period based on which the first network device sends the fault information packet of the first network device to the another network device in the network is 120 seconds, the first network device sends the fault information packet of the first network device to the another network device in the network every 120 seconds. In this embodiment of the present invention, only the example in which the first preset period is 120 seconds is used. However, this embodiment of the present invention is not limited thereto, and the first preset period may be set based on different network devices.

In some embodiments, the first network device may further flood the fault information packet of the first network device to the another network device in the network when a statistical result on a first KPI of the first network device satisfies a preset condition.

In one embodiment, that the preset condition is satisfied includes that the statistical result on the first KPI is greater than or equal to a KPI threshold set by the first network device for the first KPI.

The first KPI is one or more KPIs of the first network device.

Figure 3:
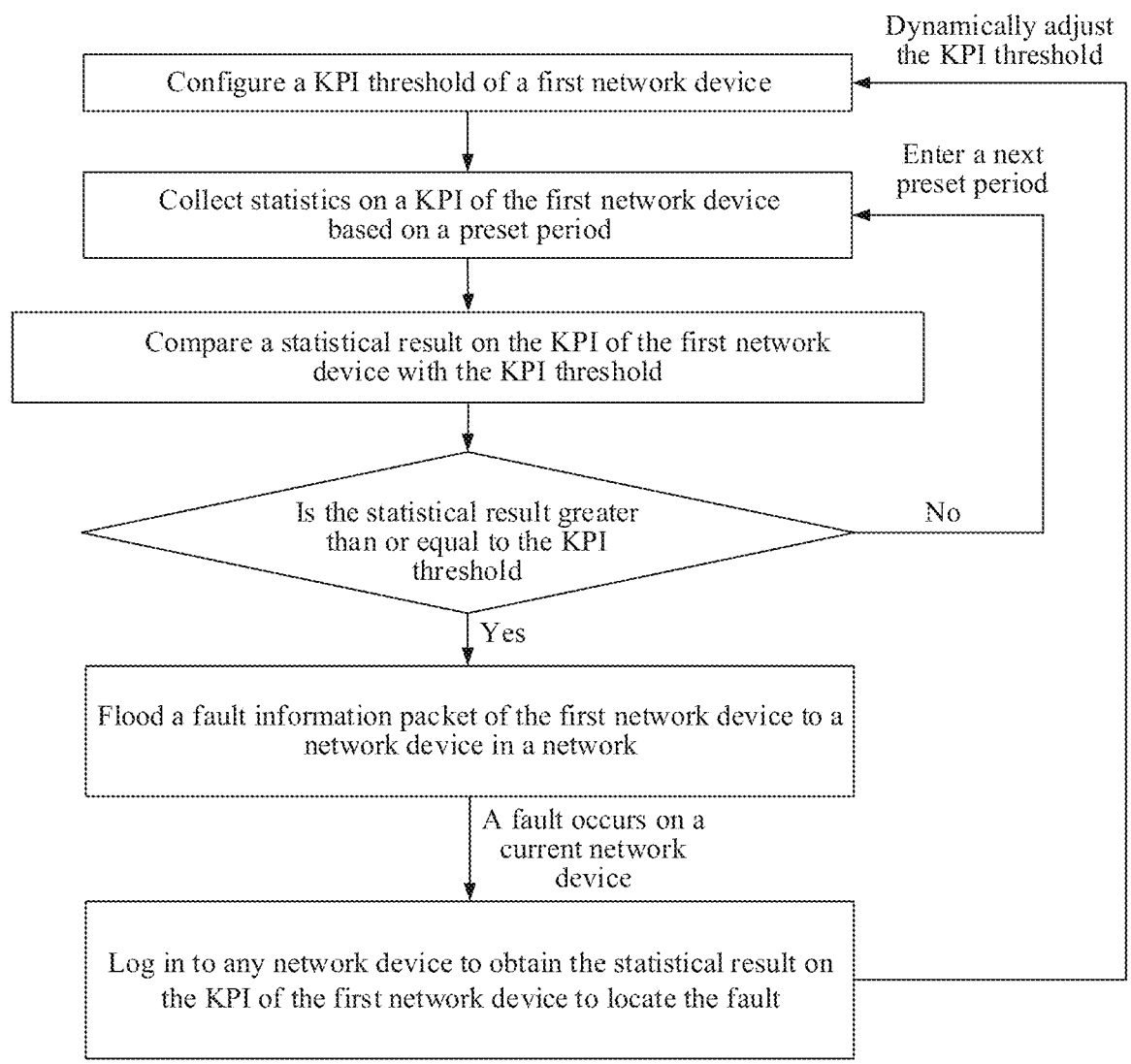
FIG. 3 is another schematic flowchart of a fault locating method according to an embodiment of the present invention.

FIG. 3 is another schematic flowchart of a fault locating method according to an embodiment of the present invention. As shown in FIG. 3, the first network device configures the KPI threshold for the first KPI of the first network device, and collects statistics on the first KPI based on the preset period, to obtain the statistical result on the first KPI, and then compares the statistical result on the first KPI with the KPI threshold set by the first network device for the first KPI. When the statistical result on the first KPI is greater than or equal to the KPI threshold, the first network device floods the fault information packet of the first network device to the another network device in the network, so that the another network device in the network determines, based on the statistical result on the first KPI that is included in the fault information packet sent by the first network device, whether the first network device has a fault.

For example, when the first KPI is a quantity of received IS-IS routing protocol packets, the KPI threshold of the first KPI is correspondingly a threshold of the quantity of received IS-IS routing protocol packets, and the threshold of the quantity of received IS-IS routing protocol packets may be a first threshold. When the quantity of the IS-IS routing protocol packets received by the first network device is greater than or equal to the first threshold, the first network device sends the fault information packet of the first network device to the another network device in the network; when the quantity of the IS-IS routing protocol packets received by the first network device is less than the first threshold, the first network device enters a next preset period to continue to collect statistics on a quantity of received IS-IS routing protocol packets.

In some embodiments, when statistical results on some of a plurality of KPIs collected by the first network device are greater than or equal to KPI thresholds respectively corresponding to the KPIs, the fault information packet sent by the first network device to the another network device in the network may include only the statistical results on the KPIs, or may include collected statistical results on all KPIs of the first network device in the preset period.

It may be understood that, when statistics on a KPI is collected by the first network device based on the preset period, the preset period may be the same as or different from the first preset period. This is not limited in this embodiment of the present invention.

A KPI threshold set by the first network device for each KPI may be manually set based on experience, or may be dynamically adjusted based on a statistical result on each KPI of the first network device that is collected when a fault previously occurs in the first network device.

For example, as shown in FIG. 3, after it is determined that the first network device is a device on which a fault occurs, the obtained statistical result on the one or more KPIs of the first network device is returned to the first network device. When configuring a KPI threshold for the one or more KPIs next time, the first network device may dynamically adjust the KPI threshold of the one or more KPIs based on the statistical result on the one or more KPIs that is collected when the fault occurs in the first network device.

By dynamically adjusting the KPI threshold of the first network device, the KPI threshold is properly set, so that the KPI threshold is not set so low that the first network device frequently sends a fault information packet to a network device in the network and resource waste is caused, nor the KPI threshold is set so high that a statistical result on a KPI of the first network device lower than the KPI threshold is not sent to the another network device in the network in time, the another network device in the network cannot obtain the statistical result on the KPI of the first network device, and cannot accurately determine whether the first network device has a fault.

In some embodiments, some network devices in the network do not support transmission of a fault information packet. In this case, a fault information packet sent by a neighboring network device of the network device not supporting transmission of a fault information packet carries a statistical result on one or more KPIs of the network device not supporting transmission of a fault information packet. For example, a third network device in the network does not support transmission of a fault information packet, so that a fault information packet sent by a second network device in the network may carry a statistical result on one or more KPIs of the third network device, and the second network device and the third network device are neighboring to each other.

Figure 4:
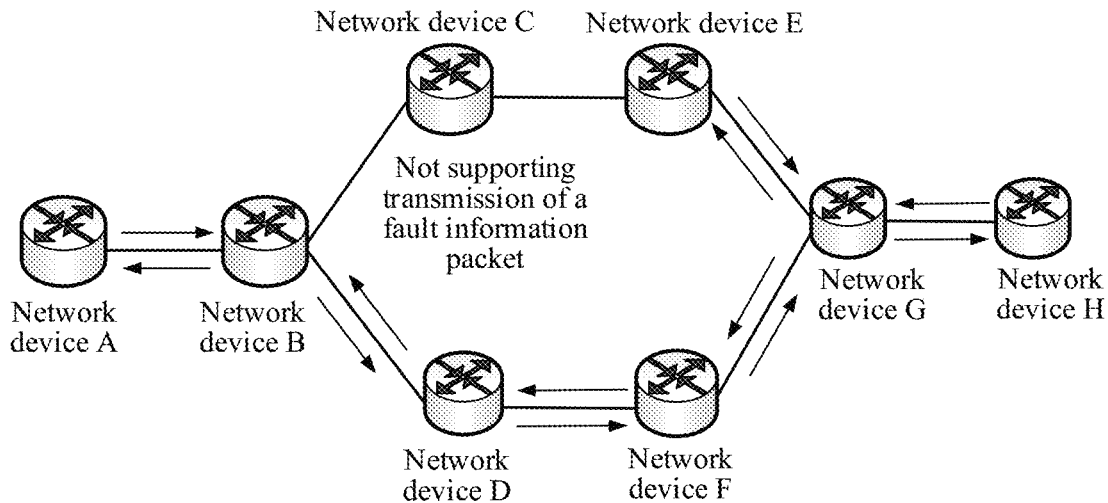
FIG. 4 is a schematic diagram of a network applicable to an embodiment of the present invention.

FIG. 4 is a schematic diagram of a network applicable to an embodiment of the present invention. As shown in FIG. 4, a network device C in the network does not support transmission of a fault information packet. In this case, a network device B and/or a network device E that is neighboring to the network device C may obtain a statistical result on one or more KPIs of the network device C through pre-configuration, so that the statistical result on the one or more KPIs of the network device C is sent to each network device in the network by the network device B or the network device E. When a fault occurs on some network devices in the network, the network devices on which a fault occurs in the network may be located by logging in to another network device in the network. Such a fault locating method is the same as the method for locating a faulty network device in FIG. 2. To avoid repetition, details are not described herein again.

It should be understood that, there may be more than one network device that does not support transmission of a fault information packet. In this embodiment of the present invention, only the example in which one network device in the network does not support transmission of the fault information packet is used. However, this embodiment of the present invention is not limited thereto.

In some embodiments, there is a case in the network that the network is divided by a network location of the network device that does not support transmission of a fault information packet. In this case, the network may be one of a first subnet and a second subnet that are divided in advance. The first subnet and the second subnet are divided based on the network location of the network device that does not support transmission of a fault information packet.

Figure 5:
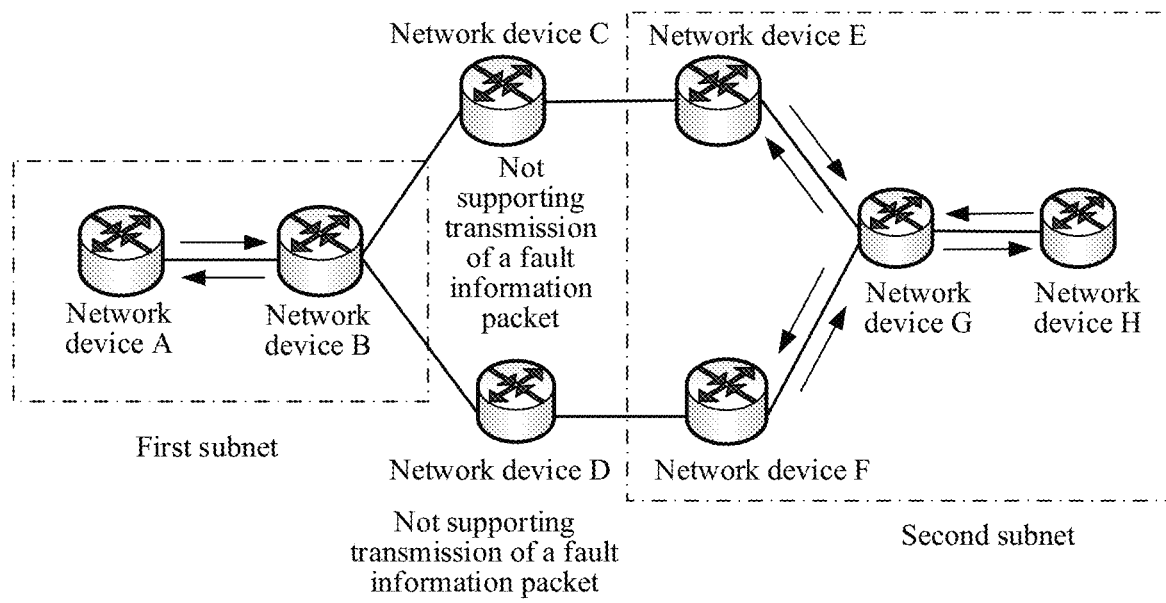
FIG. 5 is another schematic diagram of a network applicable to an embodiment of the present invention.

FIG. 5 is another schematic diagram of a network applicable to an embodiment of the present invention. As shown in FIG. 5, a network device C and a network device D are network devices that do not support transmission of a fault information packet. The network is divided into a first subnet and a second subnet by network locations of the network device C and the network device D. It may be understood that, the network may be one of the first subnet and the second subnet, so that the method for locating a faulty network device in the first subnet and the second subnet is the same as the method for locating a faulty network device in FIG. 2. To avoid repetition, details are not described herein again.

The method embodiments of the embodiments of the present invention are described in detail above with reference to FIG. 2 to FIG. 5, and embodiments of a network device of the embodiments of the present invention are described in detail below with reference to FIG. 6 and FIG. 7. It should be understood that, the embodiments of the network device correspond to the method embodiments, and for similar description, refer to the method embodiments.

Figure 6:
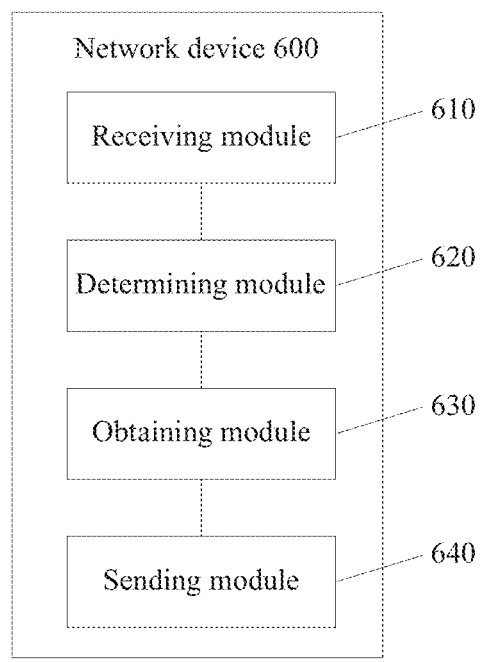
FIG. 6 is a schematic block diagram of a network device according to an embodiment of the present invention.

FIG. 6 is a schematic block diagram of a network device 600 according to an embodiment of the present invention. As shown in FIG. 6, the network device 600 includes:

a receiving module 610, configured to receive a fault information packet flooded by another network device in a network, where each fault information packet includes statistical information about an interior gateway protocol packet of the network device sending the fault information packet, and the statistical information of each network device includes a statistical result on one or more KPIs of the network device; and a determining module 620, configured to determine, based on statistical information of the network device 600 and the statistical information of the another network device, a network device on which a fault occurs in the network.

In this embodiment of the present invention, the network device receives, by using the receiving module 610, the fault information packets flooded by the another network device. In this way, information required for fault locating, that is, the statistical result on the one or more KPIs of the network device, can be quickly collected. This facilitates a fault locating process and reduces a fault locating time.

In one embodiment, the network device 600 further includes:

an obtaining module 630, configured to obtain the statistical information of the network device 600, where the statistical information includes a statistical result on one or more KPIs of the network device 600; and a sending module 640, configured to flood a fault information packet of the network device 600 to the another network device in the network, where the fault information packet of the network device 600 includes the statistical information of the network device 600.

In this embodiment of the present invention, the sending module 640 is specifically configured to flood the fault information packet of the network device 600 to the another network device in the network based on a first preset period.

In some embodiments, the sending module 640 is further configured to flood, when a statistical result on a first KPI of the network device 600 satisfies a preset condition, the fault information packet of the network device 600 to the another network device in the network.

In some embodiments, the preset condition includes that the statistical result on the first KPI is greater than or equal to a KPI threshold set by the network device for the first KPI.

In some embodiments, the preset condition may be alternatively a threshold for cosines of angles. The cosines of angles may be cosines of angles that are between vectors of all KPIs of the network device 600 and vectors of all KPI thresholds of the network device 600 and that are collected based on a preset period, or may be cosines of angles that are between vectors of some KPIs of the network device 600 and vectors of some KPI thresholds of the network device 600 and that are collected based on a preset period.

In some embodiments, the determining module 620 is specifically configured to: determine a target KPI; calculate, based on the statistical information of the network device and the statistical information of the another network device, a KPI change rate of the target KPI on each network device in the network; and select, based on the KPI change rate of the target KPI on each network device in the network, the network device on which a fault occurs from the network device and the another network device, where the KPI change rate of the target KPI on the network device on which a fault occurs is greater than or equal to a preset KPI change rate threshold.

In some embodiments, the determining module 620 is specifically configured to: determine a target KPI; obtain, based on the statistical information of the network device and the statistical information of the another network device, a statistical result that corresponds to the target KPI and that is on an interior gateway protocol packet transmitted between any two network devices in the network; generate an adjacency matrix based on the statistical result that corresponds to the target KPI and that is on an interior gateway protocol packet transmitted between any two network devices; determine a centrality of each network device in the network based on the adjacency matrix; and determine the network device on which a fault occurs in the network based on the centrality of each network device.

In some embodiments, the fault information packet is a packet dedicated for carrying a KPI of a network device, and the packet dedicated for carrying a KPI of a network device is defined based on a TLV field.

In some embodiments, the fault information packet may be alternatively an IGP protocol-based packet, and the fault information packet is extended based on a TLV field of the IGP protocol packet.

In some embodiments, a fault information packet sent by a second network device of at least one network device carries a statistical result on one or more KPIs of a third network device neighboring to the second network device, and the third network device is a network device that does not support transmission of the fault information packet.

In some embodiments, the network is one of a first subnet and a second subnet that are divided in advance. The first subnet and the second subnet are divided based on a network location of a network device that does not support transmission of the fault information packet.

It should be understood that the network device 600 according to this embodiment of the present invention may correspond to the network device in the embodiments of the present invention. The foregoing and another operations and/or functions of each module in the network device 600 are respectively intended to implement a corresponding procedure in each method in FIG. 2 to FIG. 5. For brevity, details are not described herein again.

Figure 7:
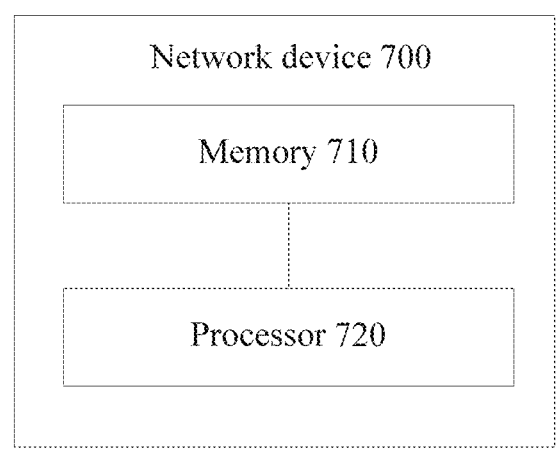
FIG. 7 is a schematic structural diagram of a network device according to an embodiment of the present invention.

FIG. 7 is a schematic structural diagram of a network device 700 according to an embodiment of the present invention. As shown in FIG. 7, the network device 700 includes a memory 710 and a processor 720. The memory 710 and the processor 720 communicate with each other by using an internal connection path, to transfer a control and/or data signal.

The memory 710 is configured to store program code.

The processor 720 is configured to invoke the program code to implement the method according to the embodiments of the present invention.

In this embodiment of the present invention, the processor 720 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. An embodiment of the present invention provides a computer-readable medium, configured to store computer program code, and the computer program code includes instructions used to perform the fault locating method according to the embodiments of the present invention in FIG. 2 to FIG. 5. The readable medium may be a read-only memory (ROM) or a random access memory (RAM). This is not limited in this embodiment of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A fault locating method, comprising:
receiving, by a first network device, a fault information packet flooded by another network device in a network, wherein each fault information packet comprises statistical information about an interior gateway protocol packet of the network device sending the fault information packet, and the statistical information of each network device comprises a statistical result on one or more key performance indicators (KPIs) of the network device;
determining, by the first network device based on statistical information of the first network device and the statistical information of the another network device, a network device on which a fault occurs in the network, wherein the statistical result on one or more KPIs comprises: a quantity of received interior gateway protocol routing protocol packets, a quantity of sent interior gateway protocol routing protocol packets, a quantity of new interior gateway protocol neighbors, and a quantity of received Purge Link State Protocol packets; and
flooding, by the first network device, a fault information packet of the first network device to the another network device, wherein the fault information packet of the first network device comprises the statistical information of the first network device, wherein the flooding is based on a first preset period or when a statistical result on a first KPI of the first network device satisfies a preset condition, and wherein the preset condition is satisfied when the statistical result on the first KPI is greater than or equal to a KPI threshold set by the first network device for the first KPI.

2. The method according to claim 1, further comprising:
obtaining, by the first network device, the statistical information of the first network device, wherein the statistical information comprises a statistical result on one or more KPIs of the first network device.

3. The method according to claim 1, wherein the determining, by the first network device based on statistical information of the first network device and the statistical information of the another network device, a network device on which a fault occurs in the network comprises:
determining, by the first network device, a target KPI;
calculating, by the first network device based on the statistical information of the first network device and the statistical information of the another network device, a KPI change rate of the target KPI on each network device in the network; and
selecting, by the first network device based on the KPI change rate of the target KPI on each network device in the network, the network device on which a fault occurs from the first network device and the another network device, wherein the KPI change rate of the target KPI on the network device on which a fault occurs is greater than or equal to a preset KPI change rate threshold.

4. The method according to claim 2, wherein the determining, by the first network device based on statistical information of the first network device and the statistical information of the another network device, a network device on which a fault occurs in the network comprises:
determining, by the first network device, a target KPI;
calculating, by the first network device based on the statistical information of the first network device and the statistical information of the another network device, a KPI change rate of the target KPI on each network device in the network; and
selecting, by the first network device based on the KPI change rate of the target KPI on each network device in the network, the network device on which a fault occurs from the first network device and the another network device, wherein the KPI change rate of the target KPI on the network device on which a fault occurs is greater than or equal to a preset KPI change rate threshold.

5. The method according to claim 1, wherein the determining, by the first network device based on statistical information of the first network device and the statistical information of the another network device, a network device on which a fault occurs in the network comprises:
determining, by the first network device, a target KPI;
obtaining, by the first network device based on the statistical information of the first network device and the statistical information of the another network device, a statistical result that corresponds to the target KPI and that is on an interior gateway protocol packet transmitted between any two network devices in the network;
generating an adjacency matrix based on the statistical result that corresponds to the target KPI and that is on an interior gateway protocol packet transmitted between any two network devices;
determining a centrality of each network device in the network based on the adjacency matrix; and
determining the network device on which a fault occurs in the network based on the centrality of each network device.

6. The method according to claim 2, wherein the determining, by the first network device based on statistical information of the first network device and the statistical information of the another network device, a network device on which a fault occurs in the network comprises:
determining, by the first network device, a target KPI;
obtaining, by the first network device based on the statistical information of the first network device and the statistical information of the another network device, a statistical result that corresponds to the target KPI and that is on an interior gateway protocol packet transmitted between any two network devices in the network;
generating an adjacency matrix based on the statistical result that corresponds to the target KPI and that is on an interior gateway protocol packet transmitted between any two network devices;
determining a centrality of each network device in the network based on the adjacency matrix; and
determining the network device on which a fault occurs in the network based on the centrality of each network device.

7. The method according to claim 1, wherein the another network device comprises a second network device, a fault information packet sent by the second network device carries a statistical result on one or more KPIs of a third network device neighboring to the second network device, and the third network device is a network device that does not support transmission of the fault information packet.

8. A first network device, wherein the first network device comprises:
- a processor; and
- a non-transitory computer readable medium which contains computer-executable instructions;
- the processor is configured to execute the computer-executable instructions to enable the first network device to perform operations comprising:
  - receiving a fault information packet flooded by another network device in a network, wherein each fault information packet comprises statistical information about an interior gateway protocol packet of the network device sending the fault information packet, and the statistical information of each network device comprises a statistical result on one or more key performance indicators (KPIs) of the network device;
  - determining, based on statistical information of the first network device and the statistical information of the another network device, a network device on which a fault occurs in the network, wherein the statistical result on one or more KPIs comprises: a quantity of received interior gateway protocol routing protocol packets, a quantity of sent interior gateway protocol routing protocol packets, a quantity of new interior gateway protocol neighbors, and a quantity of received Purge Link State Protocol packets; and
  - flooding, by the first network device, a fault information packet of the first network device to the another network device, wherein the fault information packet of the first network device comprises the statistical information of the first network device, wherein the flooding is based on a first preset period or when a statistical result on a first KPI of the first network device satisfies a preset condition, and wherein the preset condition is satisfied when the statistical result on the first KPI is greater than or equal to a KPI threshold set by the first network device for the first KPI.

9. The first network device according to claim 8, wherein the operations further comprise:
- obtaining the statistical information of the first network device, wherein the statistical information comprises a statistical result on one or more KPIs of the first network device.

10. The first network device according to claim 8, wherein the determining based on statistical information of the first network device and the statistical information of the another network device, a network device on which a fault occurs in the network comprises:
- determining a target KPI;
- calculating based on the statistical information of the first network device and the statistical information of the another network device, a KPI change rate of the target KPI on each network device in the network; and
- selecting based on the KPI change rate of the target KPI on each network device in the network, the network device on which a fault occurs from the first network device and the another network device, wherein the KPI change rate of the target KPI on the network device on which a fault occurs is greater than or equal to a preset KPI change rate threshold.

11. The first network device according to claim 9, wherein the determining based on statistical information of the first network device and the statistical information of the another network device, a network device on which a fault occurs in the network comprises:
- determining a target KPI;
- calculating based on the statistical information of the first network device and the statistical information of the another network device, a KPI change rate of the target KPI on each network device in the network; and
- selecting based on the KPI change rate of the target KPI on each network device in the network, the network device on which a fault occurs from the first network device and the another network device, wherein the KPI change rate of the target KPI on the network device on which a fault occurs is greater than or equal to a preset KPI change rate threshold.

12. The first network device according to claim 8, wherein the determining based on statistical information of the first network device and the statistical information of the another network device, a network device on which a fault occurs in the network comprises:
- determining a target KPI;
- obtaining based on the statistical information of the first network device and the statistical information of the another network device, a statistical result that corresponds to the target KPI and that is on an interior gateway protocol packet transmitted between any two network devices in the network;
- generating an adjacency matrix based on the statistical result that corresponds to the target KPI and that is on an interior gateway protocol packet transmitted between any two network devices;
- determining a centrality of each network device in the network based on the adjacency matrix; and
- determining the network device on which a fault occurs in the network based on the centrality of each network device.

13. The first network device according to claim 8, wherein the another network device comprises a second network device, a fault information packet sent by the second network device carries a statistical result on one or more KPIs of a third network device neighboring to the second network device, and the third network device is a network device that does not support transmission of the fault information packet.

14. A non-transitory computer readable medium which contains computer-executable instructions, wherein the computer-executable instructions, when executed by a processor, enables a first network device to perform operations comprising:
- receiving a fault information packet flooded by another network device in a network, wherein each fault information packet comprises statistical information about an interior gateway protocol packet of the network device sending the fault information packet, and the statistical information of each network device comprises a statistical result on one or more key performance indicators (KPIs) of the network device;
- determining, based on statistical information of the first network device and the statistical information of the another network device, a network device on which a fault occurs in the network, wherein the statistical result on one or more KPIs comprises: a quantity of received interior gateway protocol routing protocol packets, a quantity of sent interior gateway protocol routing protocol packets, a quantity of new interior gateway protocol neighbors, and a quantity of received Purge Link State Protocol packets; and flooding, by the first network device, a fault information packet of the first network device to the another network device, wherein the fault information packet of the first network device comprises the statistical information of the first network device, wherein the flooding is based on a first preset period or when a statistical result on a first KPI of the first network device satisfies a preset condition, and wherein the preset condition is satisfied when the statistical result on the first KPI is greater than or equal to a KPI threshold set by the first network device for the first KPI.

* * * * *